United States Patent [19]
Traw et al.

[11] Patent Number: 6,012,117
[45] Date of Patent: *Jan. 4, 2000

[54] METHODS AND APPARATUS FOR ARBITRATING AND CONTROLLING ARBITRATION FOR ACCESS TO A SERIAL BUS

[75] Inventors: C. Brendan S. Traw, Portland, Oreg.; David W. LaFollette, Sunnyvale, Calif.; Richard L. Coulson, Portland, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/818,638

[22] Filed: Mar. 14, 1997

[51] Int. Cl.[7] .................................................. G06F 13/14
[52] U.S. Cl. .......................................... 710/123; 710/119
[58] Field of Search .................................. 395/287, 288, 395/293, 305

[56] References Cited

U.S. PATENT DOCUMENTS

| | | | |
|---|---|---|---|
| 4,979,100 | 12/1990 | Makris et al. | 364/200 |
| 4,980,854 | 12/1990 | Donaldson et al. | 364/900 |
| 5,202,966 | 4/1993 | Woodson | 395/325 |
| 5,495,481 | 2/1996 | Duckwall | 370/85.2 |
| 5,621,898 | 4/1997 | Wooten | 395/297 |

OTHER PUBLICATIONS

IEEE Standards Department; "P1394 Standard For A High Performance Serial Bus" Draft 8.0v2, Jul. 1995, pp. ii–384.

*Primary Examiner*—Ayaz R. Sheikh
*Assistant Examiner*—Jigar Pancholi
*Attorney, Agent, or Firm*—Blakely, Sokoloff, Taylor & Zafman LLP

[57] ABSTRACT

An arbitration method for access to a serial bus includes the steps of monitoring for the presence of an arbitration reset gap on the serial bus, and arbitrating for an access, if needed, upon recognizing the presence of an arbitration reset gap on the serial bus. The method further comprises the steps of determining if immediately arbitrating for an additional access without waiting for the presence of another arbitration reset gap on the serial bus is authorized, upon successfully arbitrating for an access. If immediately arbitrating for an additional access is authorized, and the additional access is needed, arbitration for the additional access is immediately made. A method for controlling arbitration for access to a serial bus includes the step of programming bus agents with information for the bus agents to determine whether immediately arbitrating for additional accesses to the serial bus are authorized. A first apparatus suitable for used as a serial bus agent is provided with arbitration logic that performs the arbitration method. A second apparatus suitable for used as a serial bus agent is provided with arbitration control logic that performs the arbitration control method.

26 Claims, 3 Drawing Sheets

METHODS AND APPARATUS FOR ARBITRATING AND CONTROLLING ARBITRATION FOR ACCESS TO A SERIAL BUS

BACKGROUND OF THE INVENTION

1. Field of the Invention

The present invention relates to the field of computer systems. More specifically, the present invention relates to the arbitration and controlling of arbitration for access to a serial bus.

2. Background Information

Most computer systems include buses for transporting data between agents connected to the buses. Examples of buses include serial buses such as IEEE's High Performance Serial Bus (Standard P1394 of The Institute of Electrical and Electronic Engineers, Inc., draft 8.0v2 published Jul. 7, 1995, hereinafter HPSB). HPSB is also referred to as a gap-based serial bus in that it uses arbitration reset gaps to define a fairness interval, and subaction gaps to delineate between actions by the asynchronous bus agents within a fairness interval.

The fairness interval is employed to ensure that all asynchronous bus agents get their fair share of using the bus. Each asynchronous bus agent is to arbitrate for the bus only once for each fairness interval. As soon as an asynchronous bus agent wins the arbitration, it is to refrain from further arbitrating for the bus until the next arbitration reset gap is detected. In order for the gaps to be distinguishable, each gap is relatively long. The length of an arbitration reset gap is in the order of 83 to 2069 bit periods for a 100 Mbit/sec HPSB, depending on the bus topology. At 1600 Mbits/sec, the length of each arbitration reset gap increases to about 1328 to 33104 bit periods. Thus, while this approach is easy to implement, it is inefficient.

In particular, many modern day serial bus device protocols, such as SBP2[1], require a sequence of control packets to be passed between the host system and the device, prior to any movement of usable data. Under the prior art arbitration scheme, the device would have to transfer the required control packets over multiple fairness intervals, resulting in significant overhead for each transfer of data.

[1] SBP2—Serial Bus Protocol 2, working document of the X3T10 committee, a technical committee of Accredited Standards Committe.

Thus, a more efficient approach to arbitrating and controlling arbitration for access to a serial bus is desired.

SUMMARY OF THE INVENTION

A method for arbitrating for access to a serial bus is disclosed. The method comprises the steps of monitoring for the presence of an arbitration reset gap on the serial bus and when needed, arbitrating for an access to the serial bus upon recognizing the presence of an arbitration reset gap on the serial bus. The method further comprises the steps of determining if immediately arbitrating for an additional access to the serial bus without waiting for the presence of another arbitration reset gap on the serial bus is authorized. If immediately arbitrating for an additional access is authorized, and an additional access is needed, arbitrating for the additional access is immediately performed.

A method for controlling arbitration for access to a serial bus is disclosed. The method comprises the step of programming a bus agent with information used in determining whether immediately arbitrating for an additional access is authorized. In one embodiment, the information includes a value denoting the number of times the bus agent may arbitrate for access to the serial bus within a pre-defined interval. In one embodiment, the programming step is performed in accordance with a programming policy. In one embodiment, the programming policy takes into account the data transfer protocols of the bus agent being programmed.

A first apparatus suitable for use as a serial bus agent is disclosed. The apparatus includes arbitration logic for performing the steps of the arbitration method of the present invention. In one embodiment, the first apparatus further includes storage medium for storing information for use in performing the determining step. In one embodiment, the first apparatus practices a device specific protocol for performing data transfer with another bus agent.

A second apparatus suitable for use as a serial bus agent is disclosed. The second apparatus includes arbitration control logic for performing the steps of the arbitration control method of the present invention. In one embodiment, the second apparatus is a processor.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
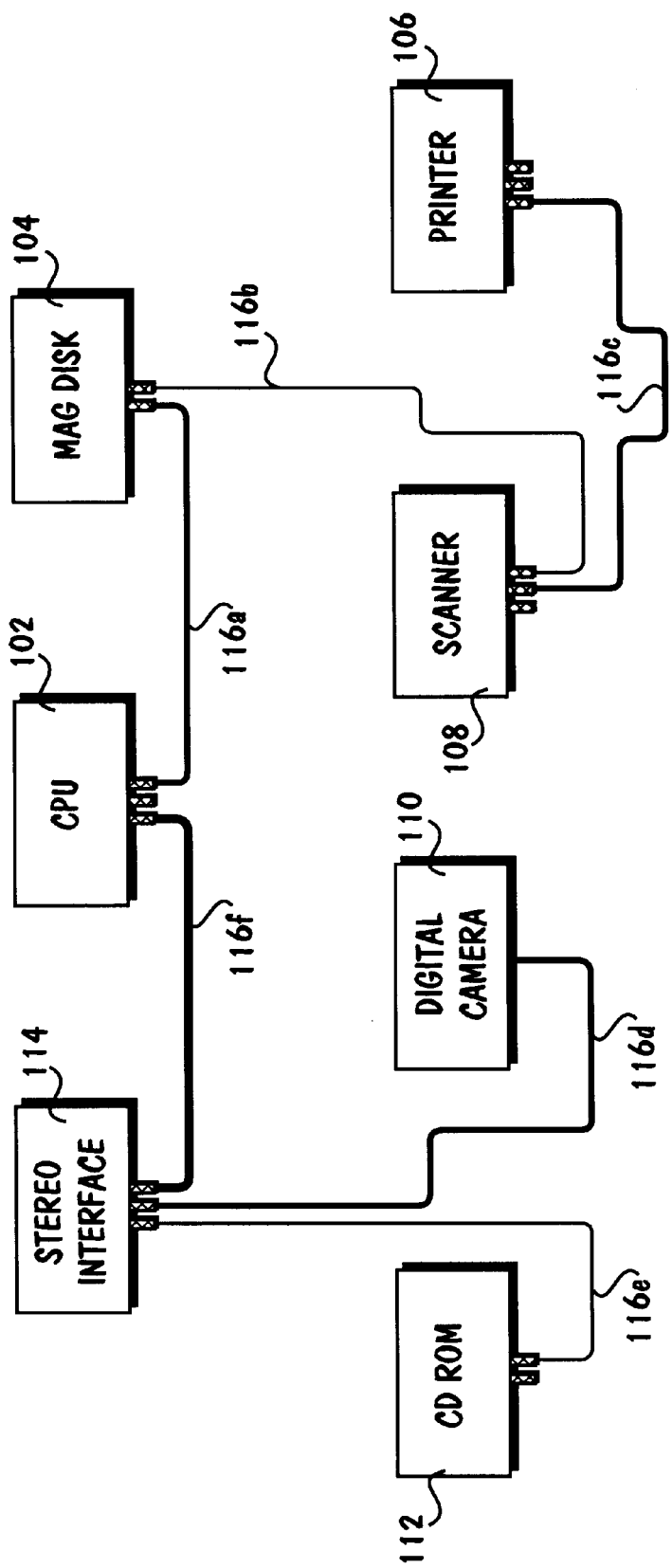
FIG. 1 is a block diagram illustrating an exemplary system of serial bus agents coupled to and cooperating with each other in accordance with the teachings of the present invention.

Referring now to FIG. 1, wherein a block diagram illustrating an exemplary system of serial bus agents coupled to and cooperating with each other in accordance with the teachings of the present invention. Exemplary system 100 comprises CPU 102, magnetic disk 104, printer 106, scanner 108, digital camera 110, CD ROM 112, and stereo interface 114. Exemplary system 100 further comprises coupling segments 116a–116f coupling elements 102–114 together in a serial and acyclical manner as shown. Together, coupling segments 116a–116f constitute a serial bus, more specifically, an IEEE P1394 HPSB. In otherwords, elements 102–114 are equipped to function as a serial bus agent in accordance with IEEE's P1394 standard, which is hereby fully incorporated by reference in its totality. Additionally, elements 102–114 are further equipped with the improved arbitration logic of the present invention, to be described more fully below.

Except for the arbitration logic of the present invention incorporated in elements 102–114, these elements and coupling segments 116a–116f are intended to represent a broad category of the respective elements known in the art. Before we proceed to describe the improved arbitration logic of the present invention in further detail, it should be noted that the number of elements illustrated are strictly illustrative in purpose. Based on the description to follow, those skilled in the art will appreciate that the present invention may be practiced with more or less of these elements.

Figure 2:
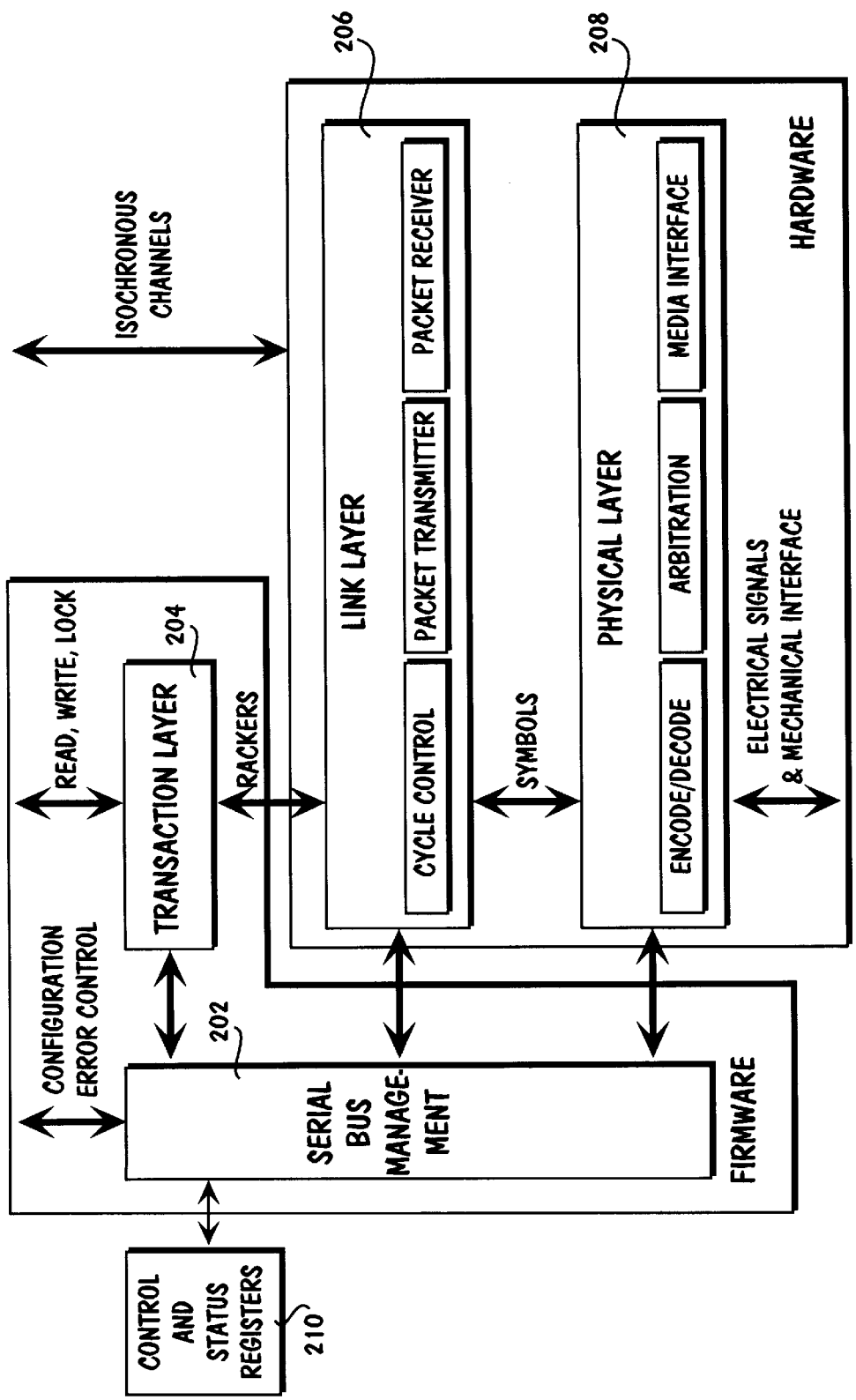
FIG. 2 is a block diagram illustrating one embodiment of a serial bus agent practicing the present invention.

FIG. 2 illustrates one embodiment of a serial bus agent practicing the present invention. As shown, for the illustrated embodiment, serial bus agent 200 comprises first and second software components 202 and 204 for implementing serial bus management functions and the transaction layer of a control and status register based communication protocol respectively, in accordance with P1394. Additionally, serial bus agent 200 further includes first and second hardware components 206 and 208 for implementing the physical and link layers of the communication protocol respectively, in accordance with P1394 and the present invention. Serial bus agent 200 also includes control and status registers 210. In one embodiment, control and status registers 210 include one or more control/status registers for storing information that facilitates determination by bus agent 200 on whether to arbitrate for more accesses within a fairness interval, to be described more fully below.

Briefly, second software component 204 implements the transaction layer of the communication protocol for providing a complete request-response communication protocol to perform the bus transactions required to support the control and status register based architecture, that is, the operations of read, write and lock. For the illustrated embodiment, the transaction layer does not provide any services for isochronous data, although it does provide a path for isochronous management data to get to the second software component 208, implementing the serial bus management functions.

First hardware component 206 implements the link layer of the communication protocol for providing an acknowledged datagram (a way data transfer with confirmation of request) service to the transaction layer. The datagram service comprises services for cycle control, packet transmission and receiving, including addressing, data checking, and data framing. The link layer also provides an isochronous data transfer service directly to isochronous applications, including generation of a "cycle" signal used for timing and synchronization. One link layer transfer is referred to as a subaction.

Second hardware component 208 implements the physical layer of the communication protocol including the services of encoding/decoding, arbitration and media interface. More specifically, the physical layer translates the logical symbols used by the link layer into electrical signals on the different serial bus media, guarantees that only one node at a time is sending data by providing an arbitration service, and defines the mechanical interfaces for the serial bus.

Finally, first software component 202 implements the management functions, which provide basic control functions and standard control and status registers needed to control the bus agent, and manage the bus resources. In one embodiment, first software component 202 includes a bus manager, an isochronous resource manager and a node controller. However, the bus manager is "active" only at a single bus agent, where the overall bus management is exercised.

For more detailed description of the base functions and responsibilities of the various components, see the incorporated by reference IEEE standard P1394.

Figure 3:
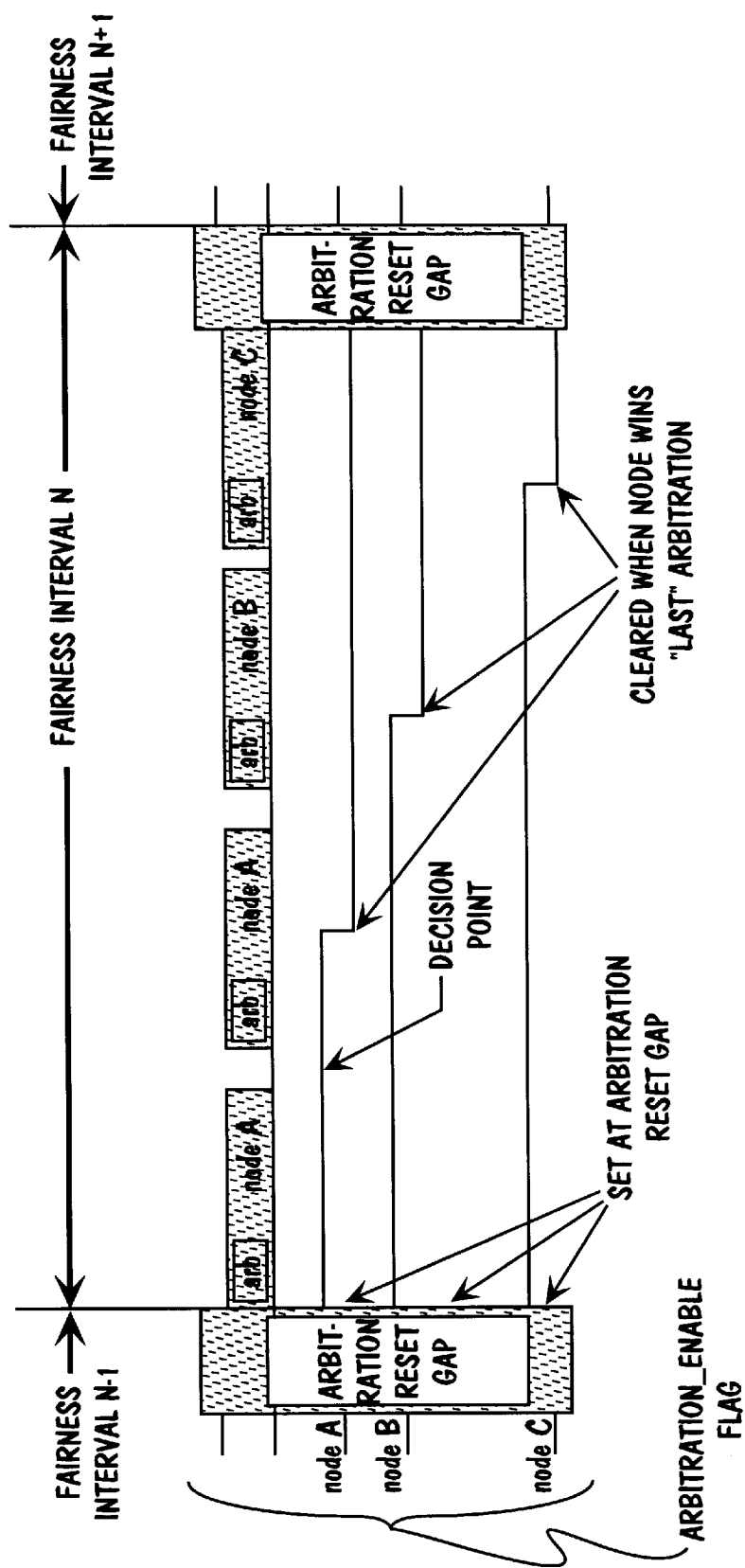
FIG. 3 is a timing diagram illustrating arbitration for bus access in accordance with the present invention.

Turning now to FIG. 3, wherein a timing diagram illustrating the arbitration method of the present invention practiced by the arbitration service of the physical layer implementing component of a bus agent is shown. As illustrated, unlike the prior art as called for by the IEEE P1394 specification, the arbitration service of an arbitrating bus agent incorporating the teachings of the present invention does not necessarily clear its arbitration signal after winning arbitration for access to the serial bus. In accordance with the present invention, the arbitrating service clears the arbitration signal only after the arbitration service has won arbitration for the "last" authorized access to the serial bus. In other words, for the authorized ones of the bus agents, each arbitration service may arbitrate for more than one access within a fairness interval, consistent with its needs and authorization level.

In other words, in accordance with the present invention, each arbitration service, upon winning arbitration for an access, determines if the arbitration signal should be maintained to arbitrate for another access (e.g. at decision point of FIG. 3). The arbitration service makes the decision based on the bus agent's need, authorization and consumption level. If the bus agent has the need, and its authorization for the number of accesses the bus agent can arbitrate for within a fairness interval has not been consumed, the arbitration service maintains the arbitration signal and continues to arbitrate for another access. Those skilled in the art will recognize that this is especially useful for devices that practice data protocols that require multiple control exchanges before the actual data exchange, such as the SBP2 protocol. A data transfer may be accomplished within a fairness interval, as oppose to spanning over multiple fairness intervals. Analysis has shown that the bus throughput will be significantly higher than the prior art P1394 approach, even though under the present invention, there is a lesser degree of fairness among the bus agents.

In the above described embodiment where control and status register includes a control/status register for storing information that facilitates the arbitration service's determination, the arbitration service retrieves the information from the control/status register in making the determination. In one embodiment, the information includes a value denoting the number of times the bus agent is authorized in arbitrating for access within a fairness interval. In one embodiment, the value is programmed into the control/status by an intelligent bus agent coupled to the serial bus, e.g. a CPU. In one embodiment, the intelligent bus agent programs the various other bus agents in accordance with a programming policy. In one embodiment, the programming policy accounts for the data transfer protocols practiced by the bus agents to be programmed. In one embodiment, the data transfer protocols practiced are provided to the intelligent bus agents by the bus agents to be programmed. Alternatively, the data transfer protocols may be inferred by the intelligent bus agents, e.g. based on the device types of the bus agents to be programmed.

In one embodiment, the value includes a special value denoting "infinite" number of immediate arbitrations. In other words, the serial bus agent never has to wait for the next arbitration reset gap. The serial bus agent simply keeps on arbitrating for additional accesses as needed, and stops the earlier described monitoring for arbitration reset gaps, and determining if immediate arbitration is to be made. Those skilled in the art will also recognize that this is especially useful when there are only two serial bus agents, such as a CPU and a disk drive, coupled to each other in accordance to P1394. The throughput will also be significantly higher than the prior art P1394 approach.

Those skilled in the art will also appreciate that the arbitration practice of the present invention is backward compatible with the basic arbitration practice specified by P1394. In other words, it is not necessary for all serial bus agents on the serial bus to be incorporated with the teachings of the invention. Those incorporated with the teachings of the present invention will nevertheless remain fully compatible and inter-operable with serial bus agents that are not equipped with the teachings of the present invention.

Those skilled in the art will also appreciate that the prior art notion of fairness can be maintained under the present invention, by programming the bus agents with information denoting the same level of authorization, e.g. N accesses for each fairness interval. While the duration of a fairness interval may increase by a factor of N, the number of fairness intervals required to accomplish a given data transfer load will be reduced by a factor of N. The fairness achieved among the bus agents will be the same as in the prior art approach. However, the likelihood of a bus agent having to complete a data transfer over multiple fairness intervals will be reduced, and the overall throughput of the serial bus will be increased, in view of the reduced number of arbitration reset gaps.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and an apparatus for arbitrating and controlling arbitration for access to a serial bus have been described.

What is claimed is:

1. A method for arbitrating for access to a serial bus, the method comprising the steps of:
   a) monitoring the serial bus for an arbitration reset gap;
   b) arbitrating for an access to the serial bus, if needed, upon recognizing the arbitration reset gap on the serial bus;
   c) determining if immediately arbitrating for an additional access to the serial bus without waiting for the presence of another arbitration reset gap on the serial bus is authorized, upon successfully arbitrating for an access to the serial bus; and
   d) immediately arbitrating for the additional access to the serial bus if the additional access is needed and the immediately arbitrating is authorized.

2. The method as set forth in claim 1, wherein step (c) comprises determining if a maximum number of authorized immediate arbitrations has been made since the last recognition of the presence of an arbitration reset gap on the serial bus.

3. The method as set forth in claim 2, wherein the method further comprises step (e) programming the maximum number of authorized immediate arbitrations in a storage medium, and step (c) comprises retrieving the maximum number of authorized immediate arbitrations from the storage medium.

4. The method as set forth in claim 3, wherein step (e) is performed in response to programming instructions from an external intelligent bus agent.

5. The method as set forth in claim 4, wherein the external intelligent bus agent is a processor.

6. The method as set forth in claim 4, wherein the external intelligent bus agent provides the programming instructions in accordance with a programming policy.

7. The method as set forth in claim 4, wherein the programming policy accounts for a bus agent's data transfer protocol.

8. The method as set forth in claim 2, wherein the maximum number is infinity, and steps (a) and (c) are skipped.

9. The method as set forth in claim 1, wherein the steps are performed by a bus agent that practices a device specific protocol for data transfers with another bus agent.

10. A method for controlling arbitration for access to a serial bus, the method comprising the steps of:
   (a) providing a programming policy; and
   (b) programming at least one bus agent coupled to the serial bus, in accordance with the programming policy, with information for each of the at least one programmed bus agent to self-determine whether immediately arbitrating for additional accesses to the serial bus is authorized upon successfully arbitrating for an initial access to the serial bus,
   wherein the information is a value denoting a maximum number of authorized immediate arbitrations a bus agent may make within a pre-defined interval, and the pre-defined interval is a fairness interval denoted by presence of arbitration reset gaps on the serial bus.

11. The method as set forth in claim 10, wherein step (b) comprises programming a first and a second of the at least one bus agent with information that denotes different authorization levels.

12. The method as set forth in claim 10, wherein step (b) comprises programming all of the at least one bus agent with the same information that denotes the same authorization level.

13. The method as set forth in claim 10, wherein step (b) comprises programming a first of the at least one bus agent with information that denotes no limit to immediately arbitrating for additional accesses.

14. The method as set forth in claim 10, wherein step (a) is applied to an intelligent bus agent coupled to the serial bus, and step (b) is performed by the intelligent bus agent.

15. The method as set forth in claim 14, wherein the intelligent bus agent is a processor.

16. An apparatus comprising
   arbitration logic to monitor a serial bus for the presence of an arbitration reset gap, to arbitrate for an access to the serial bus upon recognizing the presence of an arbitration reset gap on the serial bus, and to determine if immediately arbitrating for an additional access to the serial bus without waiting for the presence of another arbitration reset gap on the serial bus is authorized, upon successfully arbitrating for an access to the serial bus; and a storage medium coupled to the arbitration logic to store information to facilitate said determination of whether immediate arbitration is authorized.

17. The apparatus as set forth in claim 16, wherein said arbitration logic immediately arbitrates for the additional access if the additional access is needed and immediately arbitrating is authorized.

18. The apparatus as set forth in claim 16, wherein the information includes a value denoting the maximum number of authorized immediate arbitrations, and the arbitration logic retrieves the value from the storage medium to facilitate said determination of whether immediate arbitration is authorized.

19. The apparatus as set forth in claim 16, wherein the stored information denotes infinity for number of authorized immediate arbitrations, and said arbitration logic continues said arbitration without performing said monitoring and said determining.

20. The apparatus as set forth in claim 16, wherein the storage medium is a register.

21. The apparatus as set forth in claim 16, wherein the apparatus practices a device specific protocol for transferring data with another apparatus coupled to the serial bus.

22. An apparatus suitable for coupling to a serial bus, the apparatus comprising:

a programming policy; and programming logic for programming at least one other bus agent coupled to the serial bus, in accordance with the programming policy, with information for each of the at least one other bus agent to self-determine whether immediately arbitrating for additional accesses to the serial bus, upon the successful completion of an initial arbitration, is authorized, wherein the information is a value denoting a maximum number of authorized immediate arbitrations a bus agent may make within a pre-defined interval, and the pre-defined interval is a fairness interval denoted by presence of arbitration reset gaps on the serial bus.

23. The apparatus as set forth in claim 22, wherein the programming logic programs a first and a second of the at least one other bus agent with information that denotes different authorization levels.

24. The apparatus as set forth in claim 22, wherein the programming logic programs each of the at least one other bus agent with the same information that denotes the same authorization level.

25. The apparatus as set forth in claim 22, wherein the programming logic programs a first of the at least one other bus agent with information that denotes infinity for number of authorized immediate arbitrations for additional accesses.

26. The apparatus as set forth in claim 22, wherein the apparatus is a processor.

* * * * *